United States Patent
Wang et al.

(10) Patent No.: US 7,334,092 B1
(45) Date of Patent: Feb. 19, 2008

(54) METHOD AND APPARATUS FOR SCORING DATA STORAGE DEVICES FOR PARTICIPATING IN LOGICAL VOLUME EXCHANGE PROCESS

(75) Inventors: Hui Wang, Upton, MA (US); Ron Arnan, Brookline, MA (US); Tao Kai Lam, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 331 days.

(21) Appl. No.: 11/087,114

(22) Filed: Mar. 23, 2005

(51) Int. Cl.
*G06F 12/00* (2006.01)
(52) U.S. Cl. ..................... 711/158; 711/112
(58) Field of Classification Search ............ None
See application file for complete search history.

(56) References Cited

U.S. PATENT DOCUMENTS

| | | |
|---|---|---|
| 6,189,071 B1 | 2/2001 | Bachmat |
| 6,341,333 B1 | 1/2002 | Schreiber et al. |
| 6,405,282 B1 | 6/2002 | Lam et al. |
| 6,415,372 B1 | 7/2002 | Bar-Nefy et al. |
| 6,442,650 B1 | 8/2002 | Bachmat et al. |
| 6,480,930 B1 | 11/2002 | Zakai et al. |
| 6,557,074 B1 | 4/2003 | Michel et al. |
| 6,584,545 B2 | 6/2003 | Bachmat et al. |
| 6,601,133 B2 | 7/2003 | Zakai et al. |
| 6,611,896 B1 | 8/2003 | Mason, Jr. et al. ......... 711/114 |
| 6,614,616 B1 | 9/2003 | Michel et al. ............ 360/78.04 |
| 6,622,221 B1 | 9/2003 | Zahavi ..................... 711/154 |
| 6,664,964 B1 | 12/2003 | Levin-Michael et al. |
| 6,665,771 B1 | 12/2003 | Michel et al. |
| 6,671,774 B1 | 12/2003 | Lam et al. |
| 6,675,274 B1 | 1/2004 | Lam et al. |
| 6,694,405 B2 | 2/2004 | Lam et al. |
| 6,711,649 B1 | 3/2004 | Bachmat et al. |
| 6,715,039 B1 | 3/2004 | Michel et al. ............ 711/133 |
| 6,721,870 B1 | 4/2004 | Yochai et al. ............ 711/204 |
| 6,728,840 B1 | 4/2004 | Shatil et al. ............ 711/137 |
| 6,804,733 B1 | 10/2004 | Michel et al. |

*Primary Examiner*—Reginald Bragdon
*Assistant Examiner*—Ngoc Dinh
(74) *Attorney, Agent, or Firm*—BainwoodHuang (57) ABSTRACT

During sampling intervals, pairs of swap scores are assigned to respective pairs of storage devices of a storage system, each swap score pair indicating an amount of system performance improvement for a swap of logical volumes between source and target storage devices of the pair of storage devices. The swap scores are summed over all the intervals. A subset of the storage devices are then selected for a full optimization process based on the summed swap scores, where the full optimization process exhaustively looks for some number of best swaps among the storage devices to improve system performance. By choosing the size of the subset of storage devices, the processing burden required to perform the analysis will be in line with the processing capacity of the processing platform on which the analysis is performed, while achieving system performance improvement commensurate with a worst-case process in which every storage device in the system is analyzed for candidate swaps.

24 Claims, 7 Drawing Sheets

METHOD AND APPARATUS FOR SCORING DATA STORAGE DEVICES FOR PARTICIPATING IN LOGICAL VOLUME EXCHANGE PROCESS

BACKGROUND

The present invention is related to the field of data storage systems.

The performance of data storage systems typically depends in part on the arrangement or configuration of the stored data. For example, data items that are heavily utilized are often distributed among multiple storage devices in the system to avoid "bottlenecks", i.e., devices that have long service times for data accesses because of the quantity of requests they receive. System performance is generally improved when different file systems and databases that receive heavy concurrent use are stored on different storage devices within the system.

There are known techniques for improving storage system performance by selectively moving stored data within a system in a manner calculated to reduce the service times provided by devices within the system. In one such technique, statistical data is collected regarding the accesses to logical volumes stored on storage devices within a storage system. This statistical data is aggregated over many intervals to obtain a measure of average or total service time for each storage device within the system over an analysis interval that may span several days or longer. A pair of candidate storage devices and one or more pairs of potentially exchangeable logical volumes are then identified, and further processing is performed to determine whether the service times of the storage devices can be improved by exchanging the logical volumes of one or more of the pairs between the two drives, i.e., by moving each volume of the pair from its present storage device to the other storage device. In particular, it is determined whether the service time of a more heavily loaded storage device will be reduced, and the service time of a less heavily loaded storage device will not be increased unduly, if the exchange of logical volumes is performed. If so, the logical volumes are marked as a potential swap that can be performed in a subsequent swap operation. The above analysis is repeated for some number of the logical volumes of the storage system (which may be as many as all of them) to identify potential swaps that can be performed, and some number of these swaps can be carried out in subsequent swap operations. This process is repeated at periodic measurement intervals to enable the system to continuously adjust to changing workloads and other factors affecting the pattern of disk activity.

A technique which is similar to that described above is provided in U.S. Pat. No. 6,711,649 to Bachmat et al. entitled "Load Balancing on Disk Array Storage Device," the teachings of which are hereby incorporated by reference in their entirety.

SUMMARY

Although the performance of storage systems can be improved by using a selective logical volume swapping process as described above, both the time required to access the workload statistics and the processing required for the analysis can become quite large as the number of storage devices and logical volumes in the storage system increase. In particular, these processing burdens increase roughly as the square of the number of logical volumes to be analyzed. If the number of logical volumes is sufficiently high, it may not be possible to complete the exhaustive searching of the technique described above within a reasonable budget of processing resources, such as computation time on a standard single-processor computer. In such a case, the process may not be able to adequately optimize the configuration of the logical volumes on the storage devices.

In accordance with embodiments of the present invention, a technique is disclosed for performing a more selective logical-volume swapping process, referred to as an optimization process, in a storage system. Generally the technique involves a filtering of the storage devices in order to select a subset that represent good candidates for finding swaps that will improve system performance. Then a full optimization process is executed for only the subset of the devices, rather than for all devices in the storage system. As a result, the processing burden associated with the optimization process is substantially less than for prior optimization approaches. However, the candidate storage devices are selected in such a way that the best swaps still tend to be identified over time, so that the performance of the storage system is improved in a manner commensurate with the performance improvement achieved when the more exhaustive process described above is utilized.

In the disclosed technique, during each of a plurality of intervals, pairs of swap scores are assigned to respective pairs of the storage devices of a storage system. The swap scores for each pair of storage devices include a source score assigned to a relatively busy source storage device of the pair and an equal-magnitude target score assigned to a relatively idle target storage device of the pair. The swap scores for each pair of storage devices are numeric values indicating a relative amount of performance improvement of the storage system that would be expected in the interval if a best swap of logical volumes were to be performed between the source and target storage devices of the pair of storage devices. For each storage device, the swap scores assigned to the storage device are summed over all the intervals. The summed swap score for each storage device generally reflects the likelihood of finding a performance-increasing logical volume swap involving the storage device.

Subsequently, a plurality of the storage devices are selected, including some number having the highest of the summed source swap scores and a generally equal number having the highest of the summed target swap scores. This selected subset of storage devices is then utilized in an optimization analysis process. The size of the subset can be chosen such that the processing burden required to perform the analysis will be in line with the processing capacity of the processing platform on which the process is performed.

The swap scores can be assigned in each interval by calculating service times for the storage devices based on the workload statistics for just the interval, ranking the storage devices according to the service times, identifying all possible swaps of logical volumes among the storage devices and ranking the swaps according to respective amounts of improvement of the service time measures of the storage devices. Then the source and target storage devices for the best swap are given the highest pair of swap scores, the source and target storage devices for the next-best swap are given the next highest pair of swap scores, etc.

In a more particular aspect, the method includes activity weighting of the swap scores to improve accuracy. The swap scores for each storage device are summed in a weighted fashion according to activity weights, where each activity weight represents a proportion of total activity of all the storage devices of the storage system for a given interval. Thus swap scores assigned in periods of higher overall activity are given more weight in the final summation than swap scores assigned in relatively idle periods. The swap scores can also be normalized to account for variation in the number of swaps identified in different sample periods. The swap scoring technique can be used in a standalone manner as a single filter of the storage devices for subsequent optimization analysis, or it can be used in conjunction with other filtering or identification algorithms whose results are merged together in some manner in order to obtain more multi-faceted and robust filtering operation.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
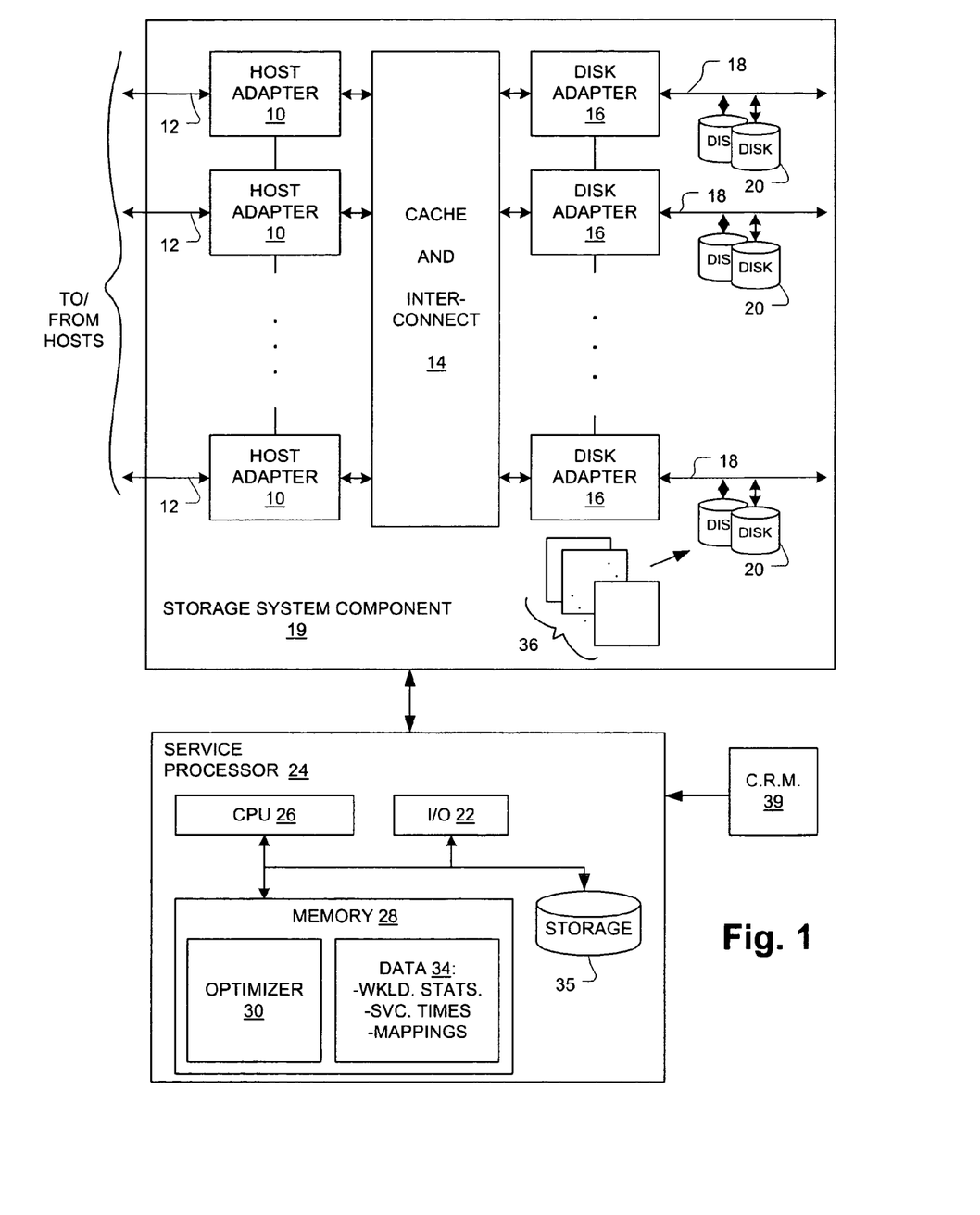
FIG. 1 is a block diagram of a data storage system including a service processor having an optimization program for performing selective volume swapping in accordance with the present invention.

FIG. 1 shows a data storage system for storing data for a number of host computers (or simply hosts). The host computers are coupled to respective host adapters 10 via respective interconnect buses 12, such as Fiber Channel or other high-speed storage interconnect buses. The host adapters 10 are coupled to cache and interconnect block 14, which in turn is coupled to disk adapters 16. Each disk adapter 16 interfaces to one or more storage buses 18 to which a plurality of storage devices 20 (e.g., disk drives) are connected. The storage buses 18 may be Small Computer System Interconnect (SCSI) buses for example.

In the illustrated embodiment, the above-described components are part of a storage system component 19 that may include a distinct physical housing. An example of such a storage system component is a Symmetrix® storage system sold by EMC Corporation.

The storage system component 19 has an interface to an input/output portion 22 of a service processor 24, which may be for example a personal computer or similar device. The service processor 24 includes a central processor (CPU) 26, a memory 28, and attached local storage 35, which is typically a disk drive. During operation, the memory 28 stores an optimization program (optimizer) 30 that has been loaded from the attached storage 35 and is executed as an optimization process by the CPU 26. The memory 28 also stores various data 34, including workload statistics and service times that are calculated as part of the optimization process, and a mapping of logical volumes to physical storage devices. The nature and use of these data are described below. The interface between the storage system component 19 and the service processor 24 permits the service processor 24 to communicate with the host adapters 10 and the disk adapters 16 for a variety of purposes, including gathering the workload statistics and swapping logical volumes among the storage devices 20 as described below. The input/output portion 22 also enables the service processor 24 to obtain the optimizer program 30 from a computer-readable medium (CRM) 39 such as a compact disc or other non-volatile storage medium.

During operation of the storage system component 19, the host adapters 10 respond to storage requests from the hosts by determining whether the requests can be satisfied from a large cache memory within the cache and interconnect block 14. In the case of host read requests for data found in the cache memory (referred to as "read hits"), the data is read from the cache memory and returned to the requesting host. In the case of host write requests, the data is written into the cache memory and is also provided to an appropriate disk adapter 16 to be stored on one or more of the storage devices 20 as determined by a storage address associated with the data. In the case of host read requests for data not found in the cache memory (referred to as "read misses"), an appropriate disk adapter 16 retrieves the data from one of the storage devices 20 (as determined by the storage address), stores the data in the cache memory, and supplies the data to the host adapter 10 from which the request originated. The requesting host adapter 10 returns the data to the requesting host. The adapters 16 also implement prefetching in order to populate the cache with data that might be the subject of subsequent read requests.

The above operations generally proceed without any involvement of the service processor 24. The service processor 24 is an ancillary device for use in configuring and managing the various resources within the storage system, especially the storage devices 20 and the data stored thereon. In particular, the optimizer program 30 of the service processor 24 is used to analyze operation of the storage system to determine whether it is possible to reconfigure the pattern of data storage on the storage devices 20 to improve system performance by reducing the time required to access data, referred to as "service time". The operation of the optimizer program 30 within the data storage system is described in detail below.

Generally, modern storage systems employ data organization constructs referred to as "logical volumes", which are units of storage that are visible to the hosts via the host adapters 10. A set of logical volumes is shown at 36 in FIG. 1. Among other attributes, a logical volume 36 has a size as represented by a range of addresses. A host to which a logical volume 36 is allocated performs input/output (I/O) operations to the logical volume 36 as though it were a distinct physical storage device. The data associated with logical volumes 36 is stored in corresponding areas of the physical storage devices 20, and the storage system maintains a map or translation structure that associates each logical volume 36 with areas on one or more storage devices 20 where data for the logical volume 36 is stored. Examples of these mappings are shown below.

In some cases, a logical volume 36 has a one-to-one mapping to an area of a single storage device 20. When data protection in the form of parity or replication is provided, a given logical volume 36 may be associated with a set of storage areas of multiple storage devices 20. At any given moment, there is a mapping of all logical volumes 36 to corresponding storage devices where the logical volume 36 data are stored. Viewed another way, this mapping also describes, for each storage device 20, the set of logical volumes 36 that are currently stored on it. The logical-to-physical mapping is generally useful for carrying out host read and write requests based on logical volume identifiers accompanying the requests. The reverse (physical-to-logical) mapping assists the optimizer 30 in associating volume-based workload statistics with individual storage devices 20, as described in more detail below. As mentioned above, a data structure representing these mappings is contained within the data 34 of the service processor 24. A simplified example of these two mappings is given in the Tables 1 and 2 below:

TABLE 1

Logical-to-Physical Mapping

| Logical Volume | Disk Device |
|---|---|
| 1 | 1, 3, 5, 7 |
| 2 | 2, 4, 6, 8 |
| 3 | 1 |
| 4 | 3, 8 |
| 5 | 2, 7 |
| . | . |
| . | . |
| . | . |
| Li | {Dj} |

TABLE 2

Physical-to-Logical Mapping

| Disk Device | Logical Volumes |
|---|---|
| 1 | 1, 3, . . . |
| 2 | 2, 5, . . . |
| 3 | 1, 4, . . . |
| . | . |
| . | . |
| . | . |
| Dj | {Li} |

In the above example, logical volumes 1, 4 and 5 appear on multiple disk drives 20 due to a parity or replication configuration as referred to above.

Figure 2:
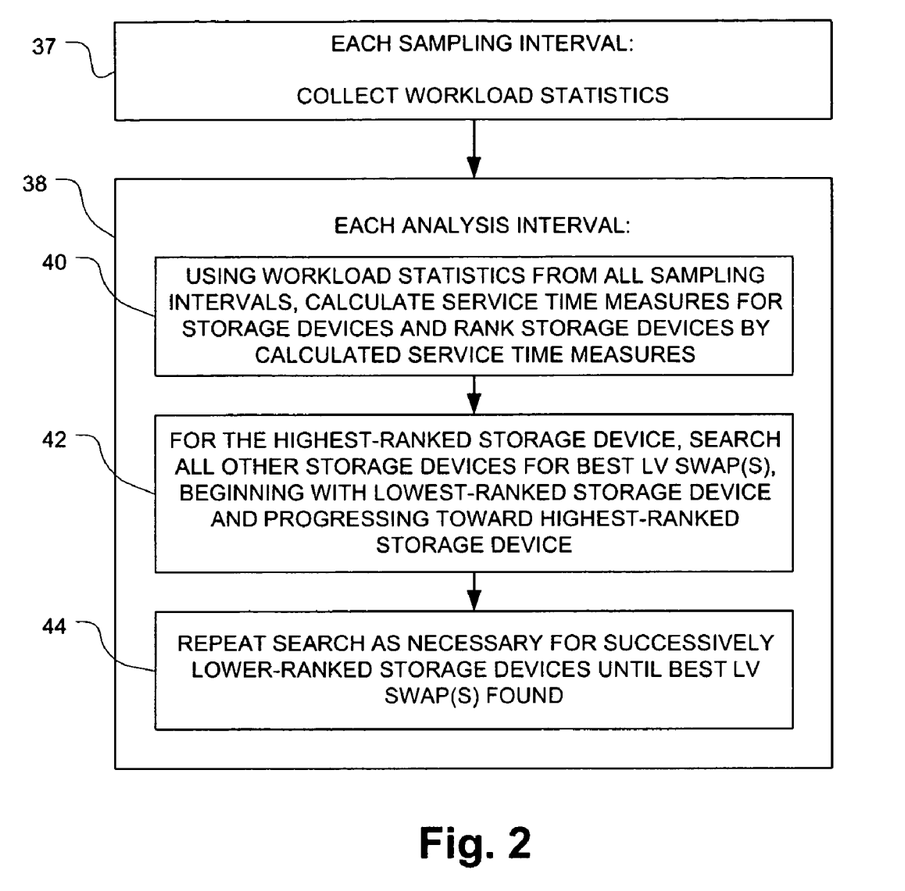
FIG. 2 is a flow diagram of an optimization process for performing an exhaustive search for logical volume swaps in the data storage system of FIG. 1.

FIG. 2 shows part of the operation of the optimizer program 30 of FIG. 1. Two distinct operational phases are shown. In a first phase, step 37 is performed once for each of a number of sample intervals. In one embodiment, the sample intervals are on the order of 10 minutes long. Shorter or longer sample intervals are possible in alternative embodiments. Shorter intervals are generally preferred for improved accuracy of the optimizer 30, while longer intervals tend to reduce the processing burden created by the optimizer 30. In a second operational phase, a set of steps 38 is performed at much longer "analysis intervals", for example one week. Again, other intervals are possible.

In step 37, the service processor 24 collects statistics regarding the workload of the storage devices 20 on a per-logical-volume basis. Due to the presence of the cache memory in the cache and interconnect block 14, the workload experienced by the storage devices 20 is generally different from the workload presented by the hosts. Host read requests that hit in the cache, for example, do not result in requests to the storage devices 20. On the other hand, the cache generates pre-fetches of data from the storage devices 20 that may never be used to satisfy a host read request. Thus, the specific workload of the storage devices 20 that is monitored includes the following transactions:

Host Read Misses
Host Writes
Prefetches

For each logical volume 36 that is involved in one of the above transactions during a sample interval, the disk adapters 16 track (1) the number of such transactions, and (2) the amount of data transferred for each transaction type. For all other logical volumes, a transaction count of zero is recorded. The service processor 24 collects this information from the disk adapters 16 and stores it in a database on the attached storage 35. This statistics-collection process is repeated during each sample interval.

In step 40 of FIG. 2, the service processor 24 retrieves the workload statistics from the attached storage 35 and uses the workload statistics to calculate per-sample-interval service times and per-analysis-interval service time measures for the storage devices 20 based on the mapping of logical volumes 36 to physical storage devices 20. The computation of service times employs a model that reflects three primary components of delay or service time in reading or writing data to/from a storage device: seek time, rotational delay, and data transfer time. The average rotational delay experienced for each transaction is estimated at ⅓ of the disk revolution period. The data transfer time is a function of the size of the data transfer, the bit density and revolution rate of the disk. These factors are applied to each transaction to arrive at a transfer time for the transaction. The transfer time is added to the rotational delay for each transaction. Then, for each storage device 20, the summed values for all transactions involving any of the logical volumes on that device are added together. The result represents the total rotational delay and transfer time for the storage device 20 over the sample interval.

The service processor 24 calculates seek time using a model that incorporates a set of predetermined seek time constants for each pair of logical volumes 36 on each storage device 20. Each seek time constant represents the time required for a seek when an access to one logical volume of the pair is followed by an access to the other logical volume of the pair. The set of seek time constants can be obtained from the manufacturer of the storage device 20, or they can be obtained empirically. The seek time constants are combined with a set of weighted transaction counts for each volume, where the weighting reflects differences among the transaction types from a device loading perspective. For example, prefetches and writes are usually more sequential in nature than read-misses, and therefore result in fewer seeks. Thus, read-misses are weighted more heavily than writes and prefetches. In one weighting scheme, the weighted transaction count for a logical volume over a sample interval is calculated as the sum of (read misses)+ ½(writes)+¼(prefetches).

The service processor 24 then calculates the total seek time for a given storage device 20 over a sample interval (in accordance with one model) as follows:

$$T(\text{seek}) = (\text{SUM}(T_{ij} * A_i * A_j))/(\text{SUM}(A_k))$$

where the SUM in the numerator is over all pairs of logical volumes i and j, $T_{ij}$ is the predetermined seek time constant for the pair of logical volumes i and j, and $A_i$ and $A_j$ are the weighted transaction counts for the same pair of logical volumes. The SUM in the denominator is the sum of all weighted transaction counts for all the logical volumes 36 on the storage device 20.

For each storage device 20, the value T(seek) is added to the values obtained for total rotational delay and data transfer time to arrive at the service time for the storage device 20 for the sample interval.

After calculating the per-sample-interval service times as above, the service processor 24 calculates respective service time measures for the storage devices 20. The service time measure for each storage device 20 is calculated by adding together the service times for the storage device over all the sample intervals. Once the service time measures for all the storage devices 20 have been calculated, the service process 24 ranks the storage devices 20 according to the calculated service time measures. An example of such a ranking is shown in the bar chart of FIG. 3, where the x-axis numbers are arbitrary storage device identifiers and the y-axis height of each bar represents the magnitude of the calculated service time measure for the corresponding device.

Returning to FIG. 2, in step 42 the service processor 24 searches for one or more best swaps of logical volumes (LV) 36 involving the highest-ranked storage device 20 (i.e., a swap of a logical volumes on the storage device 20 having the greatest service time measure with a logical volume on some other storage device 20). The number of swaps to be identified can be a fixed or user-specified parameter of the search, and may be one or some number greater than one. It may be desirable to perform only a small number of swaps in a given analysis interval to minimize the operational disruption that occurs when a swap of logical volumes is actually carried out. Although only a small number of swaps may be performed, it is generally necessary to search for all possible swaps and then rank the swaps in order to identify the one or more best swap(s) to perform. The approach shown in FIG. 2 can be used to perform a more focused search, by evaluating swaps involving the highest-ranked storage device first and then proceeding to lower-ranked storage devices only as may be required to find the desired number of swaps.

As shown, the search for best swaps for the highest-ranked device 20 begins with the lowest-ranked storage device 20, i.e., the storage device having the lowest service time measure, and progresses toward the highest-ranked storage device 20. The goal is to find swaps that reduce the service time measure of the highest-ranked storage device 20 without unduly increasing the service time measure of the lower-ranked storage device 20, such that overall system performance is improved. During this process, the service processor 24 selects specific logical volumes 36 for potential swapping between the highest-ranked storage device 20 and the lower-ranked storage device 20. In one approach, the logical volumes 36 on each storage device 20 are ranked according to their weighted transaction counts as determined above. The logical volumes 36 of the highest-ranked device 20 are considered in order from highest-ranked to lowest-ranked, while the logical volumes of the lower-ranked storage device 20 are considered in order from lowest-ranked to highest-ranked.

An example is given to illustrate the operation of step 42. Let it be assumed that logical volumes are distributed among the ranked storage devices as follows:

| (Highest) Device 1 | ... | Device (M-1) | (Lowest) Device M |
|---|---|---|---|
| LV1 | | LV4 | LV7 |
| LV2 | | LV5 | LV8 |
| LV3 | | LV6 | LV9 |

In step 42, potential swaps of logical volumes would be analyzed in the following pair-wise fashion:
1. (LV1, LV7)
2. (LV1, LV8)
3. (LV1, LV9)
4. (LV2, LV7)
5. (LV2, LV8)
6. (LV2, LV9)
7. (LV3, LV7)
8. (LV3, LV8)
9. (LV3, LV9)
10. (LV1, LV4)
11. (LV1, LV5)
12. (LV1, LV6)
13. (LV2, LV4)
14. (LV2, LV5)
15. (LV2, LV6)
16. (LV3, LV4)
17. (LV3, LV5)
18. (LV3, LV6)

At the completion of step 42, some number of best LV swaps involving the highest-ranked storage device 20 have been identified. In some cases, this number may be zero or some non-zero number that is less than a desired minimum number of swaps to be identified. In such a case, the searching for swaps continues for successively lower-ranked storage devices 20 as shown at step 44 until either the desired number of swaps have been found or all possible swaps have been considered.

As mentioned above, as the number of storage devices 20 in the storage system component 19 grows, so does the requirement for processing resources to carry out the exhaustive best-swap searching of FIG. 2. These processing resources include input/output bandwidth of the local storage device 35 to retrieve the workload statistics, as well as CPU time for performing the analysis based on the statistics. For a given quota of processing resources, such as overall allocated computation time on the service processor 24, the process of FIG. 2 may not be able to successfully find the desired number of best swap(s). Such a situation is very undesirable.

Figure 4:
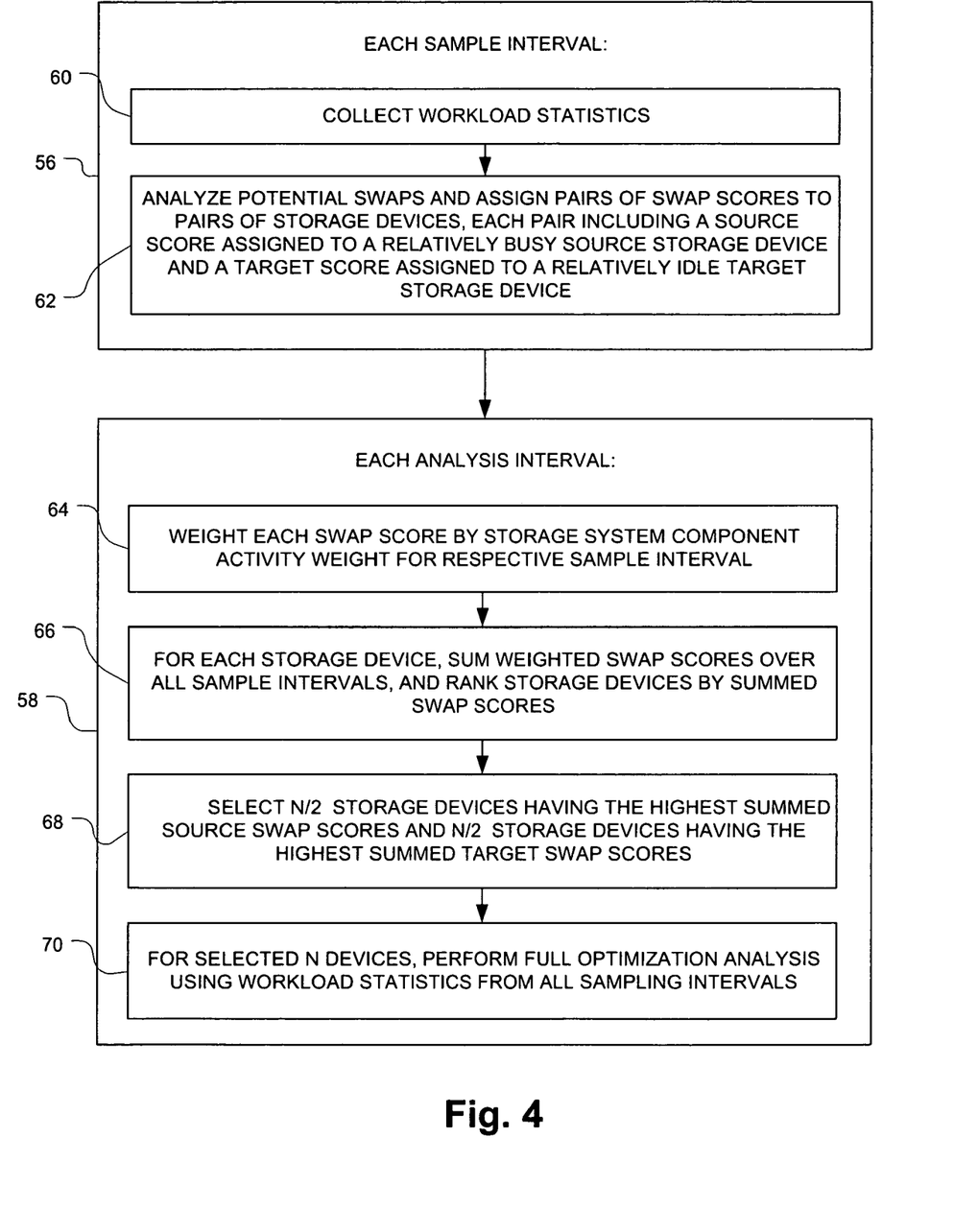
FIG. 4 is a flow diagram of an identification process for selecting a candidate set of storage devices according to swap scoring as part of an optimization analysis process in the data storage system of FIG. 1.

FIG. 4 illustrates a "swap scoring" algorithm for reducing the number of storage devices 20 for which a full analysis like that of FIG. 2 must be performed, thus reducing the processing burden without unduly reducing the accuracy of the optimization process. That is, the optimization process as limited by the swap scoring algorithm can improve the performance of the storage system component 19 in a manner commensurate with the performance improvements yielded by the full optimization process of FIG. 2, without requiring commensurate processing resources.

Figure 5:
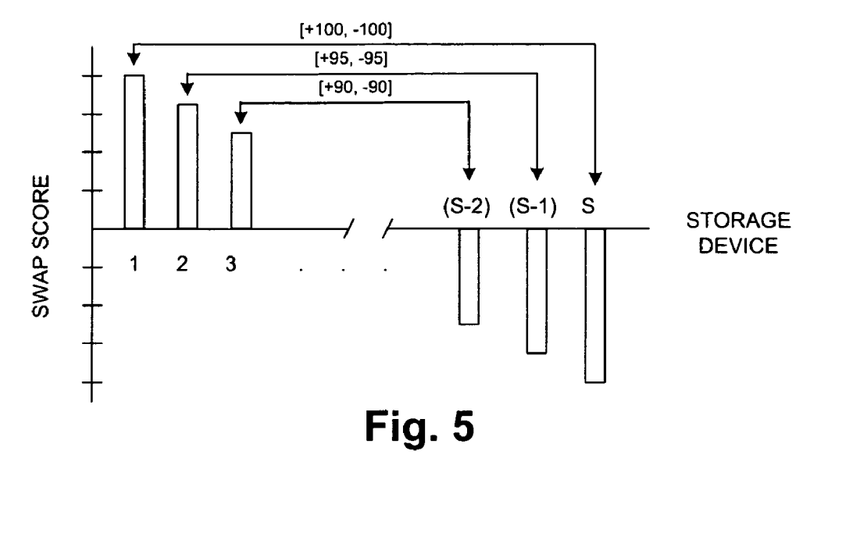
FIG. 5 is a bar chart depicting swap scores for a plurality of storage devices in the data storage system of FIG. 1.

Step 56 of FIG. 4 is performed once for each sample interval, and step 58 is performed once for each analysis interval. Step 56 includes a step 60 of collecting workload statistics, as described above with reference to FIG. 2. In step 62, swap scores are assigned to the storage devices 20 using an analysis process like that of FIG. 2 but based on only the workload statistics from the current sample interval. This analysis process is described below with reference to FIG. 6. The swaps that are identified during this analysis process are ranked according to the amount of system performance improvement that would have been expected in the sample interval if the respective logical volumes had been swapped. Each swap is associated with a "source" (relatively busy) device 20 and a "target" (relatively idle) device 20 on which the logical volumes of the swap are stored. Pairs of swap scores are assigned to the source and target devices 20 of each swap, beginning with the highest swap scores for the best swap and proceeding to successively lower swap scores for successively lower-ranked swaps. In one approach illustrated in FIG. 5, swap scores are assigned in pairs such as [+100, −100], [+95, −95], etc., where the two scores of each pair are assigned to the source and target devices respectively that are associated with the swap. In FIG. 5, source devices appear toward the left, and target devices toward the right. It will be noted that the variable S is used to denote the number of ranked devices.

It should be noted that that may be variation in the number of swaps found in each sample interval, and this variation may affect how swap scores are assigned. In one approach, the swap scores may range from 1 to the number of swaps, i.e.:

[+NS,−NS],[+NS−1,−NS+1], . . . , [+1,−1]

where NS refers to the number of swaps that are found in the sample interval. However, with such an approach, the swap scores will vary depending on the number of swaps that are found in each interval. Thus, it may be desirable to normalize the swap scores in some fashion to make them more uniform. For example, the scores may be assigned in the range of 1 to 100, and the increment adjusted based on the number of swaps found in each sample interval. In such a scheme, the following series of scores would be assigned when 20 swaps are found in an interval:

[+100,−100],[+95,−95], . . . , [+5,−5]

and the following series of scores would be assigned when 33 swaps are found in an interval:

[+100,−100],[+97,−97], . . . , [+3,−3]

et cetera.

Referring again to FIG. 4, in step 64 the service processor 24 weights the swap scores from each sample interval according to the overall activity of the storage system component 19 for the interval. The general goal is to give more weight to those swap scores assigned during relatively busy periods, on the assumption that the underlying swaps will generally have a greater overall performance impact than swaps that score commensurately during relatively idle periods. In one embodiment, an activity weight Ai is calculated for each sample interval, and then each swap score is multiplied by the corresponding activity weight divided by the sum of all activity weights over the analysis interval as shown below:

Total activity $T = \Sigma A_i$ (Weighted swap score)$_i$ = (raw swap score)$_i * (A_i/T)$ In the above calculation, each activity weight $A_i$ is the above-described weighted transaction count (e.g., (read misses)+½(writes)+¼(prefetches)) occurring in the storage system component 19 during the sample interval.

In step 66 of FIG. 4, the service processor 24 sums the weighted swap scores for each storage device 20 over all the sample intervals. The storage devices 20 are then ranked again as in FIG. 5, but this time by summed swap scores rather than the per-interval swap score. Then in step 68 some number N of these storage devices (N/2 of the highest-ranked and N/2 of the lowest-ranked) are selected. In step 70 these N devices are subject to the full optimization analysis of FIG. 2 using the workload statistics gathered over all sample intervals of the analysis interval. Thus, only potential swaps from these N devices are evaluated, rather than all potential swaps from among all the devices 20 of the storage system component 19. The processing burden of the optimization process is correspondingly reduced. Generally, N is selected to achieve a desired balance between the accuracy of the resulting optimization (improves with higher N) and the processing burden of the optimization process (diminishes with lower N). As an example, N may be on the order of 10–20% of the total number of storage devices 20 within the storage system component 19. As mentioned above, the processing burden is roughly proportional to the square of the number of storage devices 20, and thus the processing burden can be reduced by 95% or more without unduly sacrificing accuracy.

Figure 6:
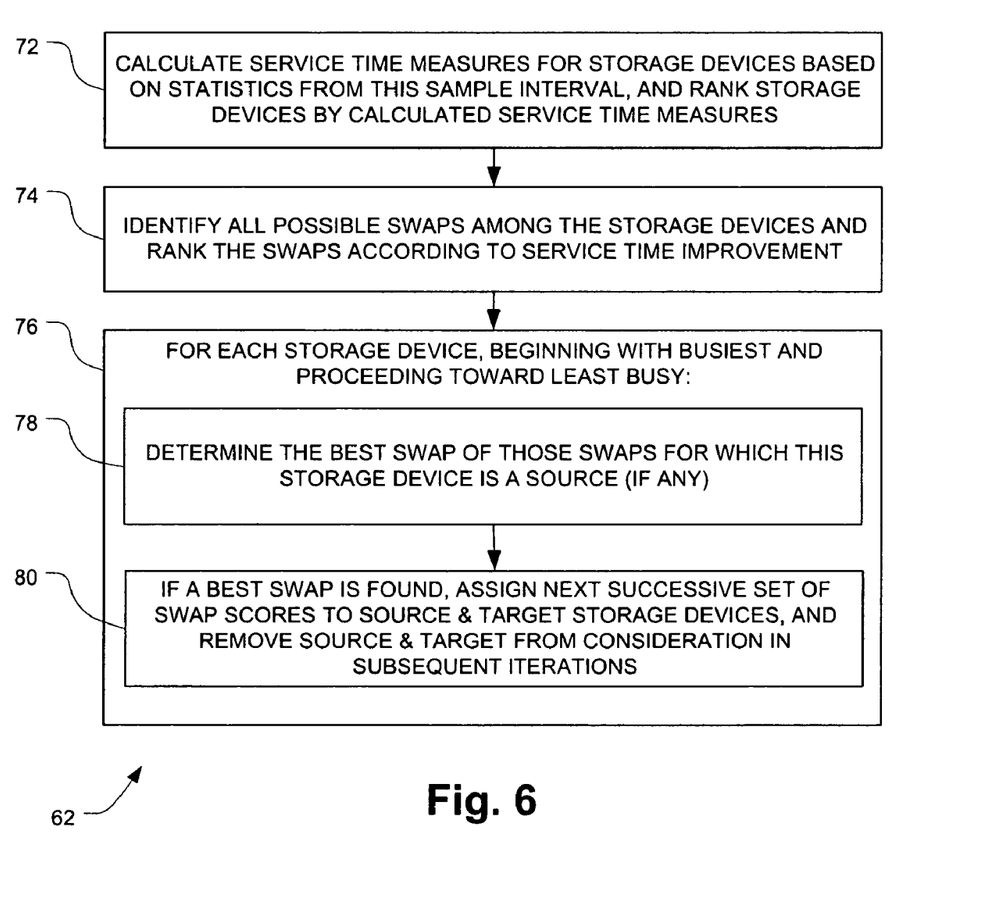
FIG. 6 is a flow diagram of processing performed in each of a plurality of sample intervals as part of the swap-score-based selection process of FIG. 4.

FIG. 6 shows the per-sample-interval swap scoring step 62 of the process of FIG. 4 in more detail. In step 72, the service processor 24 calculates service time measures for all the storage devices 20 based on the statistics gathered during the sample interval, and ranks the storage devices 20 according to their service time measures. In step 74, all possible swaps of logical volumes among the storage devices 20 are identified and ranked according to the improvement of service time that would be expected. Step 76 includes steps 78 and 80 which are repeated for each storage device 20, beginning with the highest-ranked and proceeding toward the lowest-ranked. In step 78, it is determined whether there is at least one swap involving the higher-ranked storage device as a source, and the best of such swaps is identified. If at least one swap is found, then in step 80 a set of swap scores are assigned to the storage devices containing the logical volumes of the swap (as source and target). These two storage devices are then removed from the consideration for subsequent iterations, i.e., neither of these storage devices is considered in subsequent executions of step 78 during the sample interval. The swap scores are assigned according to the above-described progression, i.e., the highest set is assigned to the first swap found, the next lower set is assigned to the second swap, etc. Referring to the example of FIG. 5, this progression of assigned swap scores is [+100, −00], [+95, −95], etc. Upon completion of the process of FIG. 6, swap scores for the interval are assigned to some or all of the storage devices 20. These swap scores are then utilized in step 58 of FIG. 4 as described above.

In the particular swap score scheme described above, the polarity of each swap score indicates whether the score is a source score or a target score. A given storage device may receive source scores from some swaps and target scores from other swaps. When the scores for the device are summed, the source and target scores automatically offset each other and reduce the magnitude of the overall score. The storage devices having positive summed swap scores constitute a set of ranked source storage devices (ranked by descending positive swap scores) and the storage devices having negative summed swap scores constitute a set of ranked target storage devices (ranked by ascending negative swap scores). Alternative scoring schemes may be employed. For example, it may be desirable to simply maintain two separate positive scores for each device (a source score and a target score), sum these scores separately to yield a summed source score and a summed target score, and create two separate ranked lists of the storage devices (one by descending source score and another by descending target score). Then, N/2 of the highest-ranked storage devices can be selected from each list. Such an approach may yield somewhat different results than that described above, because the automatic offsetting of mixed-polarity scores will be absent. It should be noted that each storage device will generally appear in both lists but in inverse order—i.e., devices ranked high in the source list will tend to be ranked low in the target list and vice versa. Any devices appearing in the upper N/2 of both lists should only be included once in the final selection.

As described above with reference to FIG. 4, the N storage devices 20 that are identified by the swap scoring method are subjected to the full optimization analysis process of FIG. 2. This technique can be seen as a standalone use of the swap scoring process. It is also possible to utilize the results of the swap scoring process in conjunction with other algorithms for identifying good candidate devices 20 for the optimization analysis, and such a use is now described with reference to FIG. 7.

Figure 7:
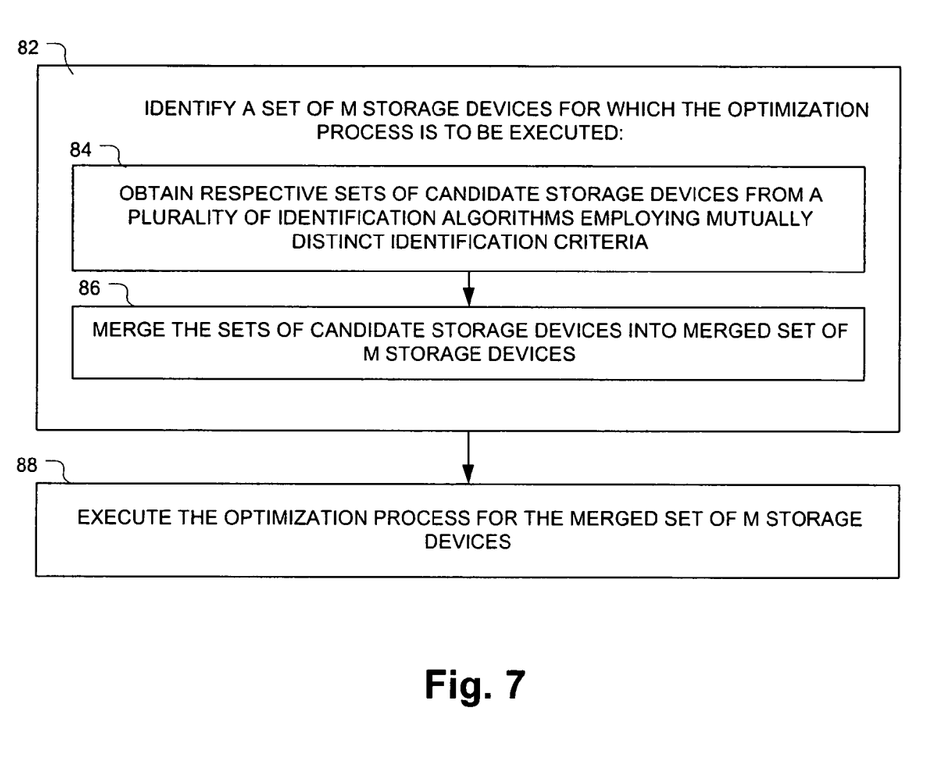
FIG. 7 is a flow diagram of an optimization process in the storage system of FIG. 1 utilizing the identification process of FIG. 4.

As shown in FIG. 7, in a first step 82, a set of M storage devices 20 is identified for which the full optimization analysis process is to be executed. In general, M can be any value up to the entire number of storage devices 20 within the storage system component 19. M may be fixed or adjustable (either manually or automatically) as necessary to keep the execution time of the overall process within some desired limit, such as one hour for example. If M is automatically adjusted, then a convenient initial value for M (for example upon re-configuring the storage system component 19 or some other initial operating state) is the total number of storage devices 20 within the storage system component 19. Thus, if there are 1000 storage devices 20 within the storage system component 19, then the initial value for M could be M=1000. During subsequent operation, M would automatically be adjusted downward as necessary to achieve the one-hour limit on execution time.

Step 82 includes step 84 in which the service processor 24 identifies respective sets of candidate storage devices 20 using multiple identification algorithms that employ different identification criteria. One such algorithm can be the swap scoring algorithm described above with reference to FIGS. 4-6, the result of which is a selection of some predetermined number of the highest-ranked and lowest-ranked storage devices 20 (according to the swap scores). Because different identification algorithms (including the swap scoring algorithm) have built-in biases that may affect the overall accuracy of the optimization process, it is desirable to obtain additional sets of good candidate storage devices 20 from other identification algorithms.

Figure 3:
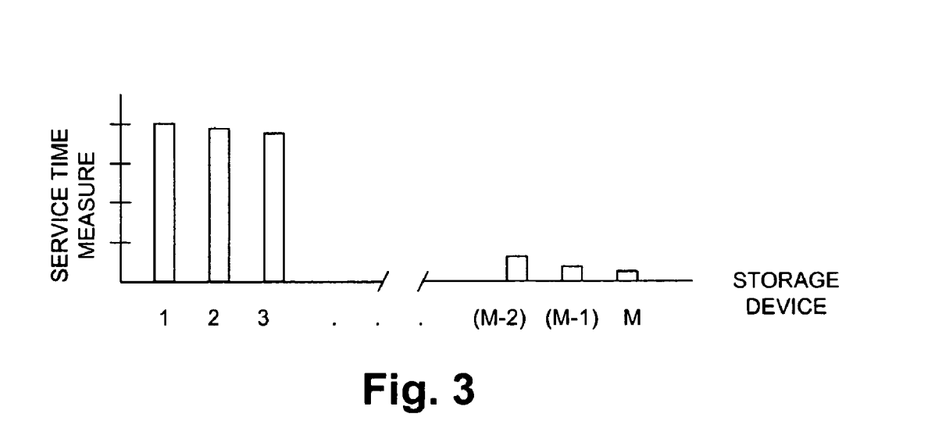
FIG. 3 is a bar chart depicting service times for a plurality of storage devices in the data storage system of FIG. 1.

According to a second such identification algorithm, then, the service processor 24 may simply select a predetermined number of the highest-ranked and lowest-ranked storage devices 20 according to the service time ranking of FIG. 3. This identification algorithm has the benefit of simplicity, given that the ranking of FIG. 3 is already required for execution of the optimization analysis process.

In a third identification algorithm, the service processor 24 selects some number of storage devices 20 at random. The presence of a random element in the identification process may be desirable to avoid any systematic inaccuracies due to the nature of the identification criteria used by the other identification algorithms.

After the service processor 24 has identified sets of candidate storage devices 20 by the various identification algorithms in step 84, it merges these sets into a final set of M storage devices in step 86. Merging may be accomplished in a variety of ways, and may to some extent be dependent on the identification results. As an example, let it be assumed that M=80 storage devices 20 are to be selected from among 200 storage devices 20 within the storage system component 19, and that the above three identification algorithms are utilized. If each set of candidate storage devices 20 from the various identification algorithms has at least one-third of eighty (i.e., 27) storage devices 20, then 27 are taken from each set. If one or more of the sets has fewer than 27 storage devices 20, then more can be taken from another set or sets. If, because of overlaps between the sets of candidates, the resulting selection is smaller than 80, then additional candidates can be chosen from one or more of the sets. In alternative embodiments, it may be desirable to take different proportions from the different sets, such as 60% from one, 30% from a second, and 10% from a third. The proportions may be fixed or varied over time. Because of the desirability of some degree of randomness, it is preferable that some number of randomly selected storage devices 20 be included in the final set of M storage devices 20.

Once the merged set of M storage devices 20 has been identified, then in step 88 the service processor 24 performs the full optimization analysis process (such as described above with reference to FIG. 2) on this identified set of M devices.

Referring back to the swap scoring process of FIGS. 4-6, it may be more expedient in an alternative embodiment to compute the swap scores for a collection of consecutive sample intervals rather than for each sample interval individually. A modified swap scoring technique based on this approach is now described.

Figure 8:
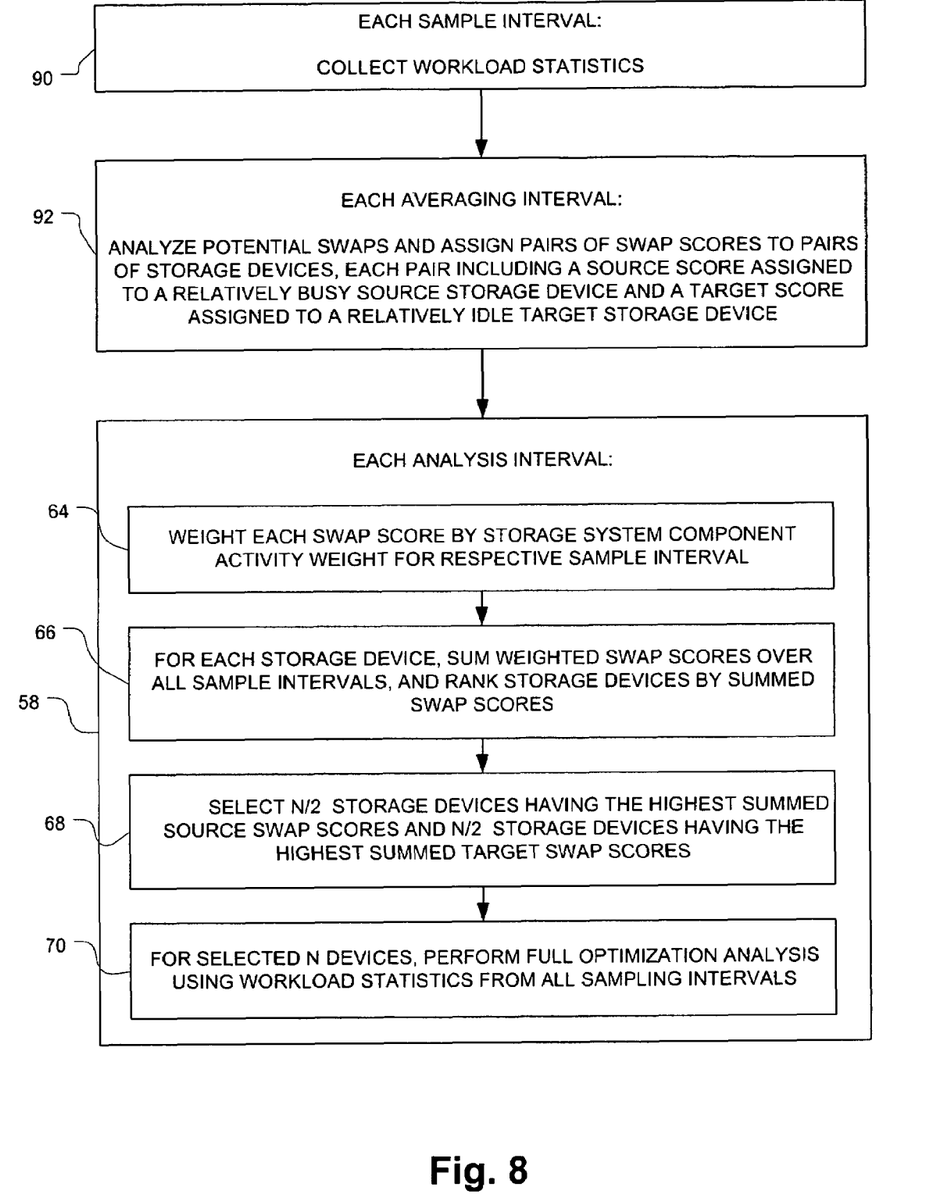
FIG. 8 is a flow diagram of another identification process for selecting a candidate set of storage devices according to an alternative swap scoring technique as part of an optimization analysis process in the data storage system of FIG. 1.

Referring to FIG. 8, in step 90 the workload statistics are collected during each sample interval, as described above. Step 92 is then performed once for each "averaging interval" which in general spans some number of sample intervals. The length of the averaging interval may be specified as a number of consecutive sample intervals, such as three or four, or it may be specified as an independent time interval, such as 30 minutes for example. This latter approach has the benefit that the averaging interval remains constant even if the duration of the sample interval is changed, for example by user control. Upon completion of step 92, the per-analysis-interval processing of step 58 is performed, which in the illustrated embodiment is the same as described above with reference to FIG. 4.

Figure 9:
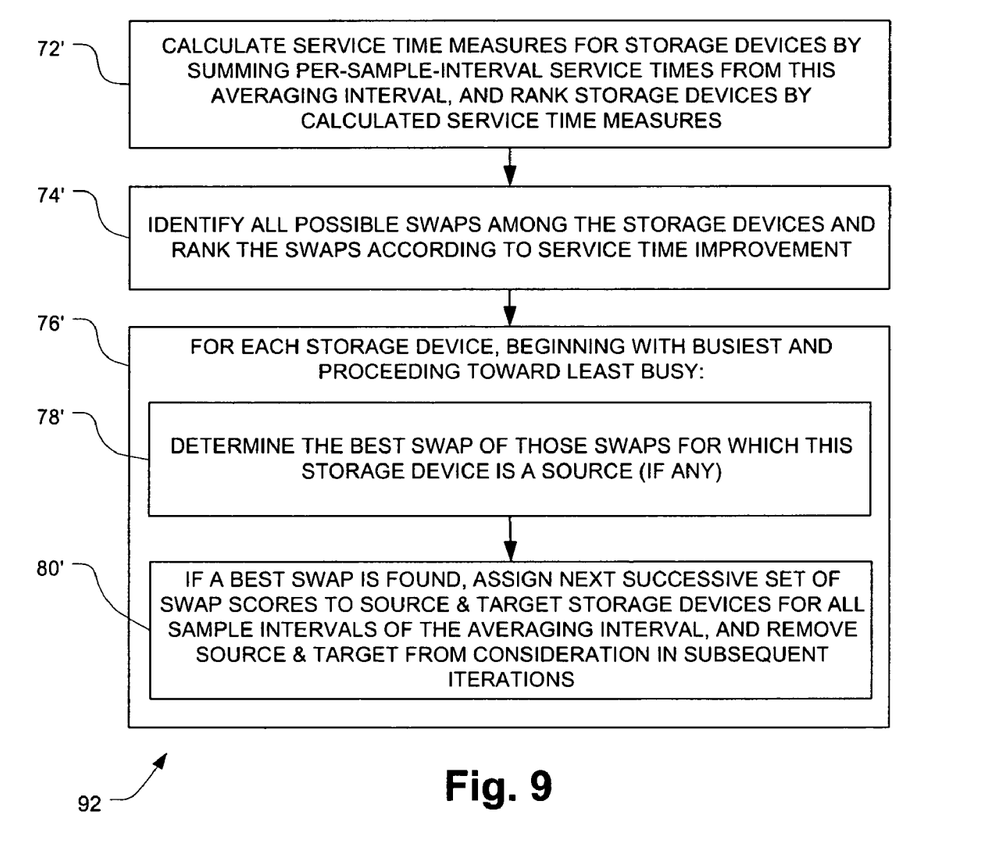
FIG. 9 is a flow diagram of processing performed in each of a plurality of averaging intervals as part of the alternative swap-score-based selection process of FIG. 8.

In step 92 of FIG. 8, potential swaps are analyzed and swap scores are assigned to pairs of storage devices in a manner similar to step 62 of FIG. 4. However, the analysis is performed using service time measures that reflect service times over the averaging interval, rather than service time measures that reflect per-sample-interval service times. As shown in FIG. 9, step 92 includes step 72' which is generally similar to its counterpart step 72 in FIG. 4, except that the service time measure for each storage device in the averaging interval is the sum of the per-sample-interval service times for the storage device over the averaging interval. As an example, if there are three sample intervals in the averaging interval and the service times for a given storage device tallied for the sample intervals are 100, 67, and 102, then the sum 269 will be used as the service time measure for the storage device for the averaging interval.

Steps 74' through 78' are the same as their counterpart steps 74 through 78 of FIG. 4 except that they are based on the averaging interval service time measures as calculated in step 72' rather than on per-sample-interval service time measures. Step 80' is similar to its counterpart step 80 of FIG. 4, except that each set of swap scores is assigned to a pair of source and target devices for all sample intervals included in the averaging interval. That is, if a set of swap scores [+90, −90] are to be assigned to a pair of storage devices for the averaging interval, then these scores are assigned to the pair of storage devices for each sample interval included in the averaging interval. These per-sample-interval swap scores are then utilized in the analysis-interval processing 58 of FIG. 8.

It is to be understood that the invention may be embodied in a processing device such as the service processor 24, generally including a memory loaded with program component(s) such as the optimizer program 30 that, when loaded into the memory and executed by a processor, cause the processor to implement the functionality described and claimed herein. Such processor-implemented methods are in some cases referred to herein by the term "process" used in the general sense of "method" as opposed to its stricter sense in the context of a computer operating system, for example. It also may be embodied in a computer-readable medium on which such program component(s) are stored in a non-volatile manner, for loading into the processor memory and execution. Additionally, in alternative embodiments part or all of the functionality may be performed from within a storage system component such as storage system component 19 or on a host computer for example.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of identifying a subset of storage devices of a storage system to participate in a logical volume exchange process for improving performance of the storage system, comprising:
   (A) during each of a plurality of intervals, assigning respective pairs of swap scores to respective pairs of the storage devices, the swap scores for each pair of storage devices including a source score assigned to a relatively busy source storage device of the pair of storage devices and a target score assigned to a relatively idle target storage device of the pair of storage devices, the swap scores for each pair of storage devices indicating a relative amount of performance improvement of the storage system that would be expected in the interval if a swap of logical volumes were to be performed between the source and target storage devices of the pair of storage devices;
   (B) for each storage device of the storage system, summing the swap scores assigned to the storage device over the plurality of intervals to generate a summed swap score;
   (C) ranking the storage devices according to their summed swap scores to identify (1) a set of ranked source storage devices and (2) a set of ranked target storage devices; and
   (D) forming the subset of storage devices by selecting a plurality of the highest-ranked source storage devices and a generally equal number of the highest-ranked target storage devices.

2. A method according to claim 1, wherein the swap scores for each storage device are summed in a weighted fashion according to respective activity weights for the intervals, each activity weight representing a proportion of activity in the corresponding interval to the total activity in the plurality of intervals.

3. A method according to claim 2, wherein the activity of the storage devices is expressed in terms of a number of data transfer transactions.

4. A method according to claim 1, wherein the swap scores for each interval are normalized based on the total number of swap scores assigned in the interval.

5. A method according to claim 1, wherein the source scores are positive scores and the target scores are negative scores, and wherein the ranked source storage devices have positive summed swap scores and the ranked target storage devices have negative summed swap scores.

6. A method according to claim 1, wherein:
   the source and target scores are both positive scores;
   the summing of the swap scores comprises summing the source scores separately from the target scores such that each storage device generally has both a summed source score and a summed target score; and
   the ranked source storage devices are ranked according to their respective source scores and the ranked target storage devices are ranked according to their respective target scores.

7. A method according to claim 1, wherein the swap-score-assigning step (A) for each interval comprises:
   calculating service time measures for the storage devices based on workload statistics for the interval, and ranking the storage devices according to the service time measures;
   identifying all possible swaps of logical volumes among the storage devices and ranking the identified swaps according to respective amounts of improvement of the service time measures of the storage devices; and
   for each of the storage devices beginning with the highest-ranked and proceeding toward a lowest-ranked:
      determining a best swap for which the storage device is a source, if any; and
      if a best swap is found, assigning the corresponding pair of swap scores to the source and target storage devices for the swap.

8. A method according to claim 7, wherein each interval is a sample interval in which the workload statistics used for calculating the service time measures of the sample interval have been gathered.

9. A method according to claim 7, wherein each interval is an averaging interval comprising a plurality of sample intervals for which respective service times for the storage devices have been calculated from the per-sample-interval workload statistics, and further comprising:
   aggregating the service times of the sample intervals over the averaging interval to produce the service time measures; and
   as part of assigning each pair of swap scores to the source and target storage devices for each swap, assigning the pair of swap scores to the source and target storage devices for each sample interval of the averaging interval.

10. A method of identifying logical volumes to be exchanged among a plurality of storage devices of a storage system to improve performance of the storage system, comprising:

performing the storage device identifying method of claim 1 to identify a subset of storage devices of the storage system; and performing a full optimization analysis process on the identified subset of storage devices, the full optimization analysis process including (1) calculating service times for each of the subset of storage devices for each of the intervals and ranking the subset of storage devices by the service times, (2) for the highest-ranked storage device of the subset, searching lower-ranked storage devices of the subset for one or more best swaps of logical volumes between the highest-ranked storage device and one of the lower-ranked storage devices, the searching beginning with the lowest-ranked storage device and progressing toward the highest-ranked storage device, and (3) repeating the preceding searching step (2) for successively lower-ranked storage devices as may be necessary until a desired number of swaps are found.

11. A method of identifying logical volumes to be exchanged among a plurality of storage devices of a storage system to improve performance of the storage system, comprising:

performing a plurality of storage device identifying method to identify a corresponding plurality of subsets of storage devices of the storage system, the storage device identifying methods including the storage device identifying method of claim 1;

merging the plurality of subsets of storage devices of the storage system into a merged subset; and performing a full optimization analysis process on the merged subset of storage devices, the full optimization analysis process including (1) calculating service times for each storage device of the merged subset for each of the intervals and ranking the merged subset of storage devices by the service times, (2) for the highest-ranked storage device of the merged subset, searching the lower-ranked storage devices of the subset for one or more best swaps of logical volumes between the highest-ranked storage device and one of the lower-ranked storage devices, the searching beginning with the lowest-ranked storage device and progressing toward the highest-ranked storage device, and (3) repeating the preceding searching step (2) for successively lower-ranked storage devices as may be necessary until a desired number of swaps are found.

12. A processing device comprising a processor, memory and an input/output interface, the input/output interface being coupleable to a set of device controllers of a storage system having storage devices on which logical volumes are stored according to an actual mapping, the memory being operative to store an optimizer program executable by the processor, the processor being operative when executing the optimizer program component to perform an optimization process for identifying a subset of a plurality of storage devices of a storage system to participate in a logical volume exchange process for improving performance of the storage system, the optimization process comprising:

(A) during each of a plurality of intervals, assigning respective pairs of swap scores to respective pairs of the storage devices, the swap scores for each pair of storage devices including a source score assigned to a relatively busy source storage device of the pair of storage devices and a target score assigned to a relatively idle target storage device of the pair of storage devices, the swap scores for each pair of storage devices indicating a relative amount of performance improvement of the storage system that would be expected in the interval if a swap of logical volumes were to be performed between the source and target storage devices of the pair of storage devices;

(B) for each storage device of the storage system, summing the swap scores assigned to the storage device over the plurality of intervals to generate a summed swap score;

(C) ranking the storage devices according to their summed swap scores to identify (1) a set of ranked source storage devices and (2) a set of ranked target storage devices; and (D) forming the subset of storage devices by selecting a plurality of the highest-ranked source storage devices and a generally equal number of the highest-ranked target storage devices.

13. A processing device according to claim 12, wherein the swap scores for each storage device are summed in a weighted fashion according to respective activity weights for the intervals, each activity weight representing the proportion of activity in the corresponding interval to a total activity in the plurality of intervals.

14. A processing device according to claim 13, wherein the activity of the storage devices is expressed in terms of a number of data transfer transactions.

15. A processing device according to claim 12, wherein the swap scores for each interval are normalized based on the total number of swap scores assigned in the interval.

16. A processing device according to claim 12, wherein the source scores are positive scores and the target scores are negative scores, and wherein the ranked source storage devices have positive summed swap scores and the ranked target storage devices have negative summed swap scores.

17. A processing device according to claim 12, wherein:

the source and target scores are both positive scores;

the summing of the swap scores comprises summing the source scores separately from the target scores such that each storage device generally has both a summed source score and a summed target score; and the ranked source storage devices are ranked according to their respective source scores and the ranked target storage devices are ranked according to their respective target scores.

18. A processing device according to claim 12, wherein the swap-score-assigning step (A) for each interval comprises:

calculating service times for the storage devices based on workload statistics for the interval, and ranking the storage devices according to the service times;

identifying all possible swaps of logical volumes among the storage devices and ranking the identified swaps according to respective amounts of improvement of the service times of the storage devices; and for each of the storage devices beginning with the highest-ranked and proceeding toward a lowest-ranked:
determining a best swap for which the storage device is a source, if any; and
if the best swap is found, assigning the corresponding pair of swap scores to the source and target storage devices for the swap.

19. A processing device according to claim 18, wherein each interval is a sample interval in which the workload statistics used for calculating the service times of the sample interval have been gathered.

20. A processing device according to claim 18, wherein each interval is an averaging interval comprising a plurality of sample intervals for which respective service times for the storage devices have been calculated from the per-sample-interval workload statistics, and further comprising:
aggregating the service times of the sample intervals over the averaging interval to produce service time measures; and
as part of assigning each pair of swap scores to the source and target storage devices for each swap, assigning the pair of swap scores to the source and target storage devices for each sample interval of the averaging interval.

21. A processing device according to claim 12, wherein the optimization process further comprises:
performing a full optimization analysis process on the selected plurality of storage devices, the full optimization analysis process including (1) calculating service times for each of the subset of storage devices for each of the intervals and ranking the subset of storage devices by the service times, (2) for the highest-ranked storage device of the subset, searching lower-ranked storage devices of the subset for one or more best swaps of logical volumes between the highest-ranked storage device and one of the lower-ranked storage devices, the searching beginning with the lowest-ranked storage device and progressing toward the highest-ranked storage device, and (3) repeating the preceding searching step (2) for successively lower-ranked storage devices as may be necessary until a desired number of swaps are found.

22. A processing device according to claim 12, wherein the steps (A)-(C) form at least part of a first storage device identifying method, and wherein the optimization process further comprises:
performing a plurality of storage device identifying processes to identify a corresponding plurality of subsets of storage devices of the storage system, the storage device identifying processes including the first storage device identifying method of claim 1;
merging the plurality of subsets of storage devices of the storage system into a merged subset; and
performing a full optimization analysis process on the merged subset of storage devices, the full optimization analysis process including (1) calculating service times for each storage device of the merged subset for each of the intervals and ranking the merged subset of storage devices by the service times, (2) for the highest-ranked storage device of the merged subset, searching lower-ranked storage devices of the subset for one or more best swaps of logical volumes between the highest-ranked storage device and one of the lower-ranked storage devices, the searching beginning with the lowest-ranked storage device and progressing toward the highest-ranked storage device, and (3) repeating the preceding searching step (2) for successively lower-ranked storage devices as may be necessary until a desired number of swaps are found.

23. A storage system, comprising:
a plurality of storage devices on which logical volumes are stored according to an actual mapping;
a set of device controllers operative to:
(A) collect workload statistics for the logical volumes for each of a plurality of sampling intervals; and
(B) copy logical volumes among the storage devices as part of swap operations; and
a processing device operative to perform an optimization process for identifying a subset of the plurality of storage devices of the storage system to participate in a logical volume exchange process for improving performance of the storage system, the optimization process comprising:
(A) during each of a plurality of intervals, assigning respective pairs of swap scores to respective pairs of the storage devices, the swap scores for each pair of storage devices including a source score assigned to a relatively busy source storage device of the pair of storage devices and a target score assigned to a relatively idle target storage device of the pair of storage devices, the swap scores for each pair of storage devices indicating a relative amount of performance improvement of the storage system that would be expected in the interval if a swap of logical volumes were to be performed between the source and target storage devices of the pair of storage devices;
(B) for each storage device of the storage system, summing the swap scores assigned to the storage device over the plurality of intervals to generate a summed swap score;
(C) ranking the storage devices according to their summed swap scores to identify (1) a set of ranked source storage devices and (2) a set of ranked target storage devices; and
(D) forming the subset of storage devices by selecting a plurality of the highest-ranked source storage devices and a generally equal number of the highest-ranked target storage devices.

24. A computer program storage medium on which an optimizer program is stored, the optimizer program being operative when executed by a processor in a storage system to perform an optimization process for identifying a subset of a plurality of storage devices of a storage system to participate in a logical volume exchange process for improving performance of the storage system, the optimization process comprising:
(A) during each of a plurality of intervals, assigning respective pairs of swap scores to respective pairs of the storage devices, the swap scores for each pair of storage devices including a source score assigned to a relatively busy source storage device of the pair of storage devices and a target score assigned to a relatively idle target storage device of the pair of storage devices, the swap scores for each pair of storage devices indicating a relative amount of performance improvement of the storage system that would be expected in the interval if a swap of logical volumes were to be performed between the source and target storage devices of the pair of storage devices;

(B) for each storage device of the storage system, summing the swap scores assigned to the storage device over the plurality of intervals to generate a summed swap score;

(C) ranking the storage devices according to their summed swap scores to identify (1) a set of ranked source storage devices and (2) a set of ranked target storage devices; and (D) forming the subset of storage devices by selecting a plurality of the highest-ranked source storage devices and a generally equal number of the highest-ranked target storage devices.

\* \* \* \* \*